July 13, 1948.  F. E. FREY  2,445,217
TREATMENT OF HYDROGEN FLUORIDE SOLUTIONS
Filed April 19, 1946
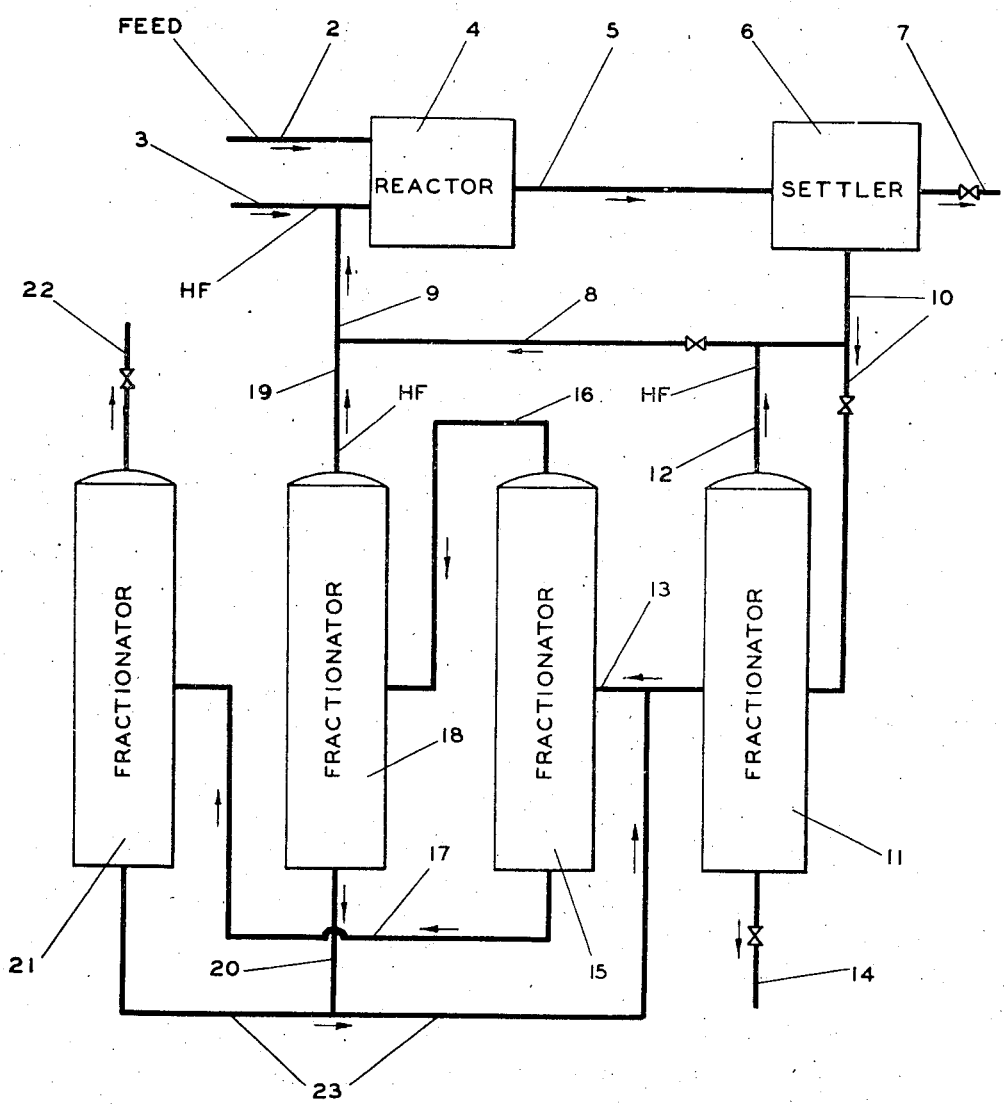
*INVENTOR.*
FREDERICK E. FREY
BY
ATTORNEYS Patented July 13, 1948

2,445,217

UNITED STATES PATENT OFFICE 2,445,217

TREATMENT OF HYDROGEN FLUORIDE SOLUTIONS

Frederick E. Frey, Bartlesville, Okla., assignor to Phillips Petroleum Company, a corporation of Delaware Application April 19, 1946, Serial No. 663,453

5 Claims. (Cl. 260—683.4)

This invention relates to the treatment of hydrogen fluoride solutions. In one embodiment this invention relates to the recovery of anhydrous hydrogen fluoride from an azeotropic mixture with water. In another aspect this invention relates to a hydrocarbon conversion process using hydrogen fluoride as a catalyst. In still another aspect this invention relates to the purification of a hydrofluoric acid catalyst used in a hydrocarbon conversion process.

The value of anhydrous hydrofluoric acid as a hydrocarbon conversion catalyst is recognized by those familiar with the art. This acid is used to catalyze such reactions as alkylation, isomerization, and disproportionation. In these processes it is desirable to maintain the titratable acidity of the catalyst at about 75 to 100 per cent. For this purpose, in commercial practice, part of the used acid is withdrawn from the conversion system and distilled to separate substantially pure hydrofluoric acid from the diluents that accumulate during the conversion. The chief diluents are water and a relatively high-boiling, unsaturated, acid-soluble oil. When the used acid is distilled, usually in a series of distillation steps, substantially anhydrous hydrofluoric acid is obtained as an overhead fraction, which is recycled to the hydrocarbon conversion system; acid-soluble oil is obtained as a kettle residue; and the water is withdrawn from the distillation in an intermediate fraction comprising a maximum-boiling azeotropic mixture of water and hydrofluoric acid. At atmospheric pressure this azeotropic mixture boils at about 120° C. and contains about 38 weight per cent hydrofluoric acid. Since the separation of anhydrous hydrofluoric acid from the azeotropic mixture is difficult, this intermediate fraction is frequently discarded and, consequently, considerable quantities of hydrofluoric acid are lost.

Since in commercial processes for the conversion of hydrocarbons the loss of hydrogen fluoride is significant, a method for substantially complete recovery of highly concentrated or anhydrous hydrogen fluoride is much to be desired. Furthermore, certain concentrations of hydrogen fluoride and water are very corrosive to various types of construction material. As a result of such corrosiveness, a method to control and to minimize the percentage of water in the hydrogen fluoride catalyst throughout a conversion system would simplify the construction of process equipment. In this respect, copper and Monel metal and a few other metals can be used over a relatively large range of concentrations of water in the hydrogen fluoride catalyst; however, if the concentration of water could be maintained less than about 20 per cent throughout the process use of steel and cast iron would be possible.

The present application is a continuation-in-part of my prior and co-pending application filed December 23, 1941, Serial No. 424,204, in which application was described the alternate distillation at different pressures of an aqueous azeotropic mixture of hydrogen fluoride to recover the hydrogen fluoride in the anhydrous or concentrated condition.

The object of this invention is to recover concentrated hydrogen fluoride from admixture with other materials.

Another object of this invention is to recover concentrated or anhydrous hydrogen fluoride from an azeotropic mixture of hydrogen fluoride and water.

Still another object is to recover substantially anhydrous hydrogen fluoride from an admixture of hydrogen fluoride and hydrocarbons.

Another object is to maintain substantially water-free hydrogen fluoride having a non-corrosive effect on steel and cast iron in hydrocarbon conversion processes.

Another object is to decrease the cost of hydrogen fluoride recovery and make-up in hydrocarbon conversion processes.

Another object is to provide a novel process for the alkylation of low-boiling isoparaffins with olefins in the presence of hydrogen fluoride as a catalyst.

Other objects and advantages of the present invention will become apparent to those skilled in the art from the accompanying disclosure and description.

In accordance with this invention, substantially anhydrous, or highly concentrated, hydrofluoric acid is recovered from hydrofluoric acid-water mixtures by fractionation at nonatmospheric pressure to obtain a concentrated fraction containing more acid and a dilute fraction containing less acid than the original mixture, and the concentrated fraction is fractionated at about atmospheric pressure to obtain substantially anhydrous hydrofluoric acid as an overhead product. In a preferred embodiment of the invention the hydrofluoric acid-water azeotrope is fractionated in a first step at subatmospheric pressure to obtain, as an overhead fraction, an aqueous mixture containing more than 38 weight per cent hydrofluoric acid and a kettle product containing less than 38 weight per cent hydrofluoric acid. The overhead fraction from the first step is fractionated at about atmospheric pressure in a second step to obtain substantially anhydrous hydrofluoric acid as an overhead fraction and a kettle product comprising a hydrofluoric acid-water azeotrope which azeotrope contains about 38 weight per cent hydrofluoric acid. The kettle product from the first step is fractionated at about atmospheric pressure in a third step to obtain water as an overhead fraction and the hydrofluoric acid-water azeotrope (38 weight per cent hydrofluoric acid) as a kettle product. The kettle products from the second and third steps are recycled to the first step.

In another embodiment, the first step may be operated at superatmospheric pressure, in which case the hydrofluoric acid will concentrate in the kettle product rather than in the overhead fraction. When the first distillation step is conducted at superatmospheric pressure an aqueous mixture containing less than 38 weight per cent hydrofluoric acid is obtained as an overhead fraction and a mixture containing substantially more than 38 weight per cent hydrofluoric acid is obtained as a kettle product from the first distillation step. In this embodiment the kettle product from the first step is fractionated at about atmospheric pressure in a second step to obtain substantially anhydrous hydrofluoric acid as an overhead fraction and a kettle product comprising the hydrofluoric acid-water azeotrope (about 38 weight per cent hydrofluoric acid). The overhead fraction from the first step is fractionated at about atmospheric pressure in a third step to obtain water as an overhead fraction and a hydrofluoric acid-water azeotrope of approximately the composition of the original mixture as a kettle product. The kettle products (the azeotropic mixture of water and hydrofluoric acid) from the second and third steps are recycled to the first step. Since, however, operation of the first step at superatmospheric pressures involves a comparatively high distillation temperature at which hydrofluoric acid-water mixtures are extremely corrosive, operation at subatmospheric pressure is preferred.

The accompanying drawing is a diagrammatic illustration of a preferred arrangement of apparatus suitable for practicing the invention in conjunction with a hydrofluoric acid alkylation process. A hydrocarbon feed comprising isobutane and butylenes in a molar ratio of about 6:1 is passed through inlet conduit 2 to reactor 4 in which it is intimately contacted with substantially anhydrous hydrofluoric acid, which enters the system through inlet conduit 3. Reactor 4 is maintained under alkylation conditions, which are well known in the art and need not be described in detail here. The effluent from reactor 4 passes through conduit 5 to settler 6 in which it is separated into a heavier liquid acid-rich phase and a lighter liquid hydrocarbon-rich phase. The hydrocarbon-rich phase contains the alkylation products together with unreacted paraffins. The hydrocarbon-rich phase is passed through conduit 7 to a conventional fractionation system (not shown) for recovery of the product. Most of the acid-rich phase is recycled through conduits 8 and 9 to reactor 4. A portion of the acid-rich phase is passed through conduit 10 to fractionation unit 11 which may comprise a single or a series of distillation columns. From fractionation unit 11 a low-boiling fraction comprising substantially anhydrous hydrofluoric acid is withdrawn through conduit 12 and recycled through conduits 8 and 9 to reactor 4. An intermediate fraction comprising a maximum-boiling azeotropic mixture of hydrofluoric acid and water is withdrawn through conduit 13 and passed to vacuum fractionator 15. A kettle residue comprising acid-soluble oil is withdrawn from the system through outlet conduit 14. The temperature range of fractionation unit 11 is between a kettle temperature of about 300° F. and an overhead temperature of about 70° F. Unit 11 is operated at approximately atmospheric pressure.

The pressure in vacuum fractionator 15 is substantially lower than that pressure in fractionation unit 11 and preferably less than about 50 mm. of mercury. The kettle temperature of fractionator 15 is generally below about 100° F. From vacuum fractionator 15, an overhead fraction comprising aqueous hydrofluoric acid of substantially higher acidity than that entering through conduit 13 is passed through conduit 16 to fractionator 18, which is operated at about atmospheric pressure and at a kettle temperature between about 200 and about 250° F. From fractionator 18, an overhead fraction comprising substantially anhydrous hydrofluoric acid is withdrawn through conduit 19 and recycled through conduits 9 and 3 to reactor 4; the kettle product comprising the maximum-boiling hydrofluoric acid-water azeotrope (about 38 weight per cent acid) is recycled through conduits 20, 23, and 13 to vacuum fractionator 15. The kettle product from vacuum fractionator 15 has a substantially lower acidity than the material charged through conduit 13 and is passed through conduit 17 to fractionator 21, which is preferably operated at about atmospheric pressure and a kettle temperature between about 215 and about 250° F. From fractionator 21, water is withdrawn as an overhead fraction through outlet conduit 22; the maximum-boiling hydrofluoric acid-water azeotrope (about 38 weight per cent acid) is removed as the kettle product and recycled through conduits 23 and 13 to vacuum fractionator 15. Water in conduit 22 may contain small amounts of hydrofluoric acid.

In an alternative arrangement, the overhead fraction in conduit 16 from vacuum fractionator 15 may be recycled to fractionation unit 11 through suitable conduits not shown in the drawing. When this arrangement is used, fractionator 18 may be eliminated.

EXAMPLE I

A hydrofluoric acid-water mixture containing 41.5 weight per cent hydrofluoric acid was distilled at subatmospheric pressure in a one-plate copper distillation apparatus. The acid content of the distillate and of the kettle product were determined from time to time by titration with a standard basic solution. The following data in Table I were obtained:

*Table I*

| | Original Charge | Successive Fractions Analyzed | | | | | |
|---|---|---|---|---|---|---|---|
| | | 1 | 2 | 3 | 4 | 5 | 6 |
| Pressure, mm. Hg | | 73 | 63 | 28 | 29 | 14 | 14 |
| Distillation Temp., °F | | 93 | 108 | 95 | 95 | 82 | 79 |
| Wt. of Fraction, gm. (overhead) | | 1.6 | 19.9 | 81.4 | 64.0 | 73.1 | 12.7 |
| HF in Fraction, wt. per cent | | 50.0 | 50.6 | 46.8 | 39.7 | 37.6 | 35.5 |
| Wt. of Kettle Product, gm | 308.0 | 306.4 | 286.5 | 199.8 | 134.1 | 55.8 | 40.1 |
| HF in Kettle Product, wt. per cent | 41.5 | | 40.0 | | 37.5 | 35.6 | 35.3 |

When fractions 1, 2, and 3 are combined and fractionated at atmospheric pressure, substantially anhydrous hydrofluoric acid is obtained as an overhead fraction. The concomitantly obtained kettle product, which comprises approximately the hydrofluoric acid-water azeotrope, is redistilled in a vacuum for recovery of additional hydrofluoric acid.

EXAMPLE II

The following data in Table II were obtained by distillation of an aqueous hydrofluoric acid solution at barometric conditions.

Table II

|  | Original Charge | Kettle Material |
|---|---|---|
| Pressure, mm. Hg | | 742 |
| Distillation Temp., °F | | 158 |
| Wt. of Fraction, gm. (overhead) | | 105.9 |
| HF in Fraction, wt. per cent | | 40.5 |
| Wt. of Kettle Product, gm | 200.8 | 94.9 |
| Kettle material, wt. per cent HF | 39.7 | 37.9 |

The reduced pressure of less than about 20 mm. of mercury gave a hydrogen fluoride-water azeotrope containing about 35.5 weight per cent hydrogen fluoride while the barometric pressure distillation, 742 mm. of mercury, gave an azeotropic mixture containing 37.9 weight per cent hydrogen fluoride. These data clearly indicate that reduced pressure has an effect on the concentration of hydrogen fluoride-water azeotrope.

Although the invention has been described with particular reference in the drawing to the alkylation of hydrocarbons carried out in a particular manner the invention is equally applicable to other hydrocarbon conversion processes using hydrofluoric acid as a catalyst and in which the hydrofluoric acid catalyst must be purified. Since the drawing is schematic only various apparatus, such as condensers, coolers, reflux lines, etc., have been omitted and which may be supplied by those skilled in the art without departing from the scope of this invention. Furthermore, various modifications and alterations as well as other applications of the present invention will become apparent to those skilled in the art and may be practiced without departing from the scope of this invention.

Having described my invention, I claim:

1. In a process for the alkylation of a low-boiling isoparaffin with an olefin in the presence of hydrogen fluoride as a catalyst in which a hydrocarbon alkylation effluent is separated into a liquid hydrocarbon-rich phase and a liquid hydrogen fluoride-rich phase and said hydrogen fluoride-rich phase is distilled at approximately atmospheric pressure under conditions such that an overhead fraction comprising substantially anhydrous hydrogen fluoride and a liquid bottom fraction comprising substantially an azeotropic mixture of water and hydrogen fluoride are formed, the improvement which comprises in a first step distilling said azeotropic mixture at a subatmospheric pressure of less than about 50 mm. of mercury, recovering from said first step a vaporous overhead fraction comprising hydrogen fluoride and water having a substantially greater acid concentration than in the original azeotropic mixture and a liquid kettle product comprising hydrogen fluoride and water having a substantially less acid concentration than in the original azeotropic mixture, in a second step distilling said overhead fraction from said first step at approximately atmospheric pressure, recovering from said second step a vaporous overhead fraction of substantially anhydrous hydrofluoric acid and a kettle product comprising an aqueous hydrofluoric acid solution having approximately the same acid concentration as the original azeotropic mixture, in a third step distilling said kettle product from said first step at approximately atmospheric pressure, recovering from said third step a vaporous overhead fraction of water and a kettle product comprising an aqueous hydrofluoric acid solution having approximately the same acid concentration as the original azeotropic mixture, passing the kettle products from said second step and said third step to said first step, and recycling said overhead fraction of substantially anhydrous hydrofluoric acid from said second step to the alkylation reaction as a catalyst.

2. In a process for the alkylation of a low-boiling paraffin with an olefin in the presence of an alkylation catalyst comprising hydrogen fluoride in which a hydrocarbon alkylation effluent is separated into a liquid hydrocarbon-rich phase and a liquid hydrogen fluoride-rich phase and said hydrogen fluoride-rich phase is distilled at approximately atmospheric pressure under conditions such that an overhead fraction comprising substantially anhydrous hydrogen fluoride and a liquid bottom fraction comprising substantially an azeotropic mixture of water and hydrogen fluoride are formed, the improvement which comprises distilling said azeotropic mixture at subatmospheric pressure under conditions such that an overhead fraction comprising hydrogen fluoride and water having a greater acid concentration than in the original azeotropic mixture and a liquid kettle product comprising hydrogen fluoride and water having a less acid concentration than the original azeotropic mixture are formed, distilling the overhead fraction from the first step at approximately atmospheric pressure under conditions such that an overhead fraction of substantially anhydrous hydrogen fluoride and a kettle product comprising an aqueous solution of hydrogen fluoride are formed, and recycling said overhead fraction of anhydrous hydrogen fluoride from the second step to the aforesaid alkylation reaction.

3. In a process for the alkylation of a low-boiling paraffin with an olefin in the presence of an alkylation catalyst comprising hydrogen fluoride in which a hydrocarbon alkylation effluent is separated into a hydrocarbon-rich phase and a liquid hydrogen fluoride-rich phase and said hydrogen fluoride-rich phase is distilled at approximately atmospheric pressure under conditions such that a relatively low-boiling fraction comprising highly concentrated hydrofluoric acid and a relatively high-boiling fraction comprising substantially an azeotropic mixture of water and hydrogen fluoride are formed, the improvement which comprises in a first step distilling said azeotropic mixture at nonatmospheric pressure under conditions such that a fraction comprising hydrogen fluoride and water having a greater acid concentration than in the original azeotropic mixture and a fraction comprising hydrogen fluoride and water having a less acid concentration than the original azeotropic mixture are formed, in a second step distilling the fraction of increased acid concentration from said first step at approximately atmospheric pressure under conditions such that an overhead fraction comprising highly concentrated hydrofluoric acid and a higher-boiling fraction comprising an aqueous solution of hydrogen fluoride are formed, and recycling said overhead fraction of highly concentrated hydrofluoric acid from said second step to the aforesaid alkylation reaction.

4. In a process for the conversion of hydrocarbons in the presence of a catalyst comprising hydrogen fluoride in which the conversion effluent is separated into a liquid hydrocarbon-rich phase and a liquid hydrogen fluoride-rich phase containing dissolved water therein, the improvement which comprises in a first step distilling at least a portion of said hydrogen fluoride-rich phase at subatmospheric pressure under conditions such that an overhead fraction of substantially anhydrous hydrogen fluoride and a kettle product comprising water and hydrogen fluoride which is present in an amount less than about 38 weight per cent are recovered, in a second step distilling said kettle product at approximately atmospheric pressure under conditions such that an overhead fraction of water and a kettle product comprising water and hydrogen fluoride which is present in an amount of about 38 weight per cent are recovered; passing said kettle product from said second step to said first step, and recycling said overhead fraction of anhydrous hydrogen fluoride from said first step to the conversion reaction.

5. In a process for the conversion of hydrocarbons in the presence of a catalyst comprising concentrated hydrofluoric acid in which from the conversion effluent is separated a liquid hydrogen fluoride-rich phase containing dissolved water and organic impurities, the improvement which comprises subjecting said hydrogen fluoride rich-phase to fractional distillation and separating therefrom a low-boiling fraction comprising highly concentrated hydrofluoric acid, a high-boiling fraction comprising undesired organic impurities, and an intermediate fraction comprising aqueous hydrofluoric acid, distilling said aqueous hydrofluoric acid at a subatmospheric pressure and separating therefrom a low-boiling fraction comprising hydrogen fluoride and water having a substantially greater concentration of hydrogen fluoride than said aqueous hydrofluoric acid and a high-boiling fraction comprising hydrogen fluoride and water having a substantially lower concentration of hydrogen fluoride than said aqueous hydrofluoric acid, subjecting said low-boiling fraction to distillation at a higher pressure and separating therefrom a low-boiling fraction comprising concentrated hydrofluoric acid and a high-boiling fraction comprising aqueous hydrofluoric acid, subjecting the aforesaid fraction comprising hydrogen fluoride and water having a low concentration of hydrogen fluoride to distillation separating therefrom a low-boiling fraction comprising a high concentration of water and a high-boiling fraction comprising aqueous hydrofluoric acid, passing each of said high-boiling fractions comprising aqueous hydrofluoric acid to said distillation together with the first said aqueous hydrofluoric acid, and passing to said conversion each of said concentrated hydrofluoric acid fractions.

FREDERICK E. FREY.

REFERENCES CITED

The following references are of record in the file of this patent:

UNITED STATES PATENTS

| Number | Name | Date |
|---|---|---|
| 1,676,700 | Lewis | July 10, 1928 |
| 2,018,397 | Calcott | Oct. 22, 1935 |
| 2,049,486 | Babcock | Aug. 4, 1936 |
| 2,324,255 | Britton et al. | July 13, 1943 |
| 2,381,876 | Carlson | Aug. 14, 1945 |
| 2,388,918 | Iverson | Nov. 13, 1945 |
| 2,388,919 | Iverson | Nov. 13, 1945 |

OTHER REFERENCES

Young, "Distillation Principles and Processes," published 1922 by Macmillon and Co., Ltd., St. Martin's Street, London. (Copy in Division 25, page 59.)